United States Patent
Zou et al.

[19]

[11] Patent Number: 6,106,128
[45] Date of Patent: Aug. 22, 2000

[54] ILLUMINATION SYSTEM HAVING EDGE-ILLUMINATED WAVEGUIDE AND SEPARATE COMPONENTS FOR EXTRACTING AND DIRECTING LIGHT

[75] Inventors: Han Zou, Windsor; Karl W. Beeson, Princeton; Ivan B. Steiner, Ridgewood; Scott M. Zimmerman, Basking Ridge, all of N.J.; Hefen Lin, Cupertino, Calif.

[73] Assignee: Honeywell International Inc., Morristown, N.J.

[21] Appl. No.: 09/151,631

[22] Filed: Sep. 11, 1998

[51] Int. Cl.[7] .................................................. F21V 8/00
[52] U.S. Cl. .............................. 362/31; 362/26; 362/268; 362/330; 362/331; 349/65
[58] Field of Search ............................... 362/31, 26, 330, 362/331, 19, 268; 349/65

[56] References Cited

U.S. PATENT DOCUMENTS

| | | | |
|---|---|---|---|
| 5,126,882 | 6/1992 | Oe et al. | 359/619 |
| 5,396,350 | 3/1995 | Beeson et al. | 359/40 |
| 5,528,720 | 6/1996 | Winston et al. | 385/146 |

*Primary Examiner*—Sandra O'Shea
*Assistant Examiner*—Anabel M. Ton
*Attorney, Agent, or Firm*—John G. Shudy, Jr.

[57] ABSTRACT

An illumination system has separate components for extracting and directing light from a waveguide. The system eliminates the need to provide a light directing array (LDA) that is optically and physically coupled to the waveguide. It is more reliable and robust than previous illumination systems and virtually eliminates the failures associated illumination systems having laminated LDAs. Manufacturing costs are reduced and system performance and reliability are improved. The illumination system is inexpensive to construct, and operates in an efficient, reliable manner, affording extended service at low cost.

29 Claims, 10 Drawing Sheets

ILLUMINATION SYSTEM HAVING EDGE-ILLUMINATED WAVEGUIDE AND SEPARATE COMPONENTS FOR EXTRACTING AND DIRECTING LIGHT

BACKGROUND OF THE INVENTION

1. Field of the Invention

This invention relates to illumination systems, and more particularly, to an edge-lit illumination system having separate light extracting and light directing components.

2. Description of the Prior Art

Both light extraction and direction in an illumination system using a single light directing array (LDA) are typically accomplished by the same LDA that is intimately coupled, i.e. physically and optically, to a waveguide. The dual functionality of the LDA (i.e. light extraction and direction) requires that the LDA be fabricated separately from the waveguide and then secured thereto by lamination, adhesive, etc. The LDA typically comprises a plurality of three-dimensional prisms (e.g. pyramidal) that contact only a portion of the light output surface of the waveguide and provide a contact area between the LDA and the waveguide of less than 100%, e.g. typically between 8% and 20%. The overall rigidity of the waveguide and the tendency of the separately fabricated LDA to warp over time causes the LDA to separate from the waveguide, resulting in failure of the illumination system. Furthermore, optical coupling between the LDA and waveguide is subject to stringent requirements, and even minor disturbances affect the performance of the illumination system.

There exists a need in the art for an illumination system having light extraction and direction features that overcome the above-described shortcomings of the prior art.

SUMMARY OF THE INVENTION

The present invention provides an illumination system having separate components for extracting and directing light from a waveguide that need not be intimately coupled together. By providing separate components for the light extracting and directing functions, the present invention eliminates the need to provide a single light extracting and light directing component such as, for example, an LDA, that is optically and physically coupled to the waveguide. In addition, the present invention provides a more reliable and robust illumination system that virtually eliminates the failures associated with prior art illumination systems having laminated LDAs, reduces the cost of manufacturing an illumination system, and improves the overall performance and reliability of illumination systems constructed in accordance with the present invention.

In a first embodiment of the present invention, an illumination system for distributing light rays from a light source comprises a waveguide for propagating light rays from the light source and having a first refractive index that is greater than 1. The illumination system further comprises a light extracting structure having a light extracting feature defined thereron for facilitating the egress of light rays directly from the solid waveguide through the light extracting structure. The light extracting feature, when viewed in cross-section, has a wide side and a narrow side, with the wide side being located closer to the solid waveguide than the narrow side. The illumination system further comprises an interface for coupling the light extracting structure with approximately 100% contact to the solid waveguide. The interface has a second refractive index that is less than the first refractive index of the waveguide.

In a second embodiment of the present invention, an illumination system for distributing light rays from a light source comprises a solid waveguide for propagating light rays from the light source and having a first refractive index that is greater than 1. The illumination system further comprises a light extracting structure having a light extracting feature defined thereon for facilitating the egress of light rays directly from the solid waveguide through the light extracting structure. The light extracting feature, when viewed in cross-section, has a wide side and a narrow side, with the wide side being located closer to the solid waveguide than the narrow side. The illumination system further comprises an interface for coupling the light extracting structure with approximately 100% contact to the solid waveguide. The interface has a second refractive index that is less than the first refractive index. A light directing structure, separate from the light extracting structure and having a light directing feature defined thereon is provided for directing the distribution of light output from the illumination system. The light directing feature being complementarily sized and shaped to the light extracting feature and positioned in registered engagement therewith.

In a third embodiment of the present invention, an illumination system for distributing light rays from a light source comprises a solid waveguide having a refractive index greater than 1 and a light extracting structure unitarily formed therewith including a light extracting feature for facilitating the passage of light rays directly from the solid waveguide through the light extracting structure. A light directing structure, separate from the light extracting structure and having a light directing feature defined thereon is provided for directing the distribution of light rays from the light extracting structure. The light directing feature is complementarily sized and shaped with the light extracting feature and positioned in registered engagement therewith.

Advantageously, the present illumination system eliminates the need to provide an LDA that is optically and physically coupled to the waveguide. It is more reliable and robust than previous illumination systems and virtually eliminates the failures associated with illumination systems having laminated LDAs. Manufacturing costs are reduced and system performance and reliability are improved. The illumination system is inexpensive to construct, and operates in an efficient, reliable manner, affording extended service at low cost.

BRIEF DESCRIPTION OF THE DRAWINGS

The invention will be more fully understood and further advantages will become apparent when reference is made to the following detailed description of the preferred embodiments of the invention and the accompanying drawings in which like reference characters denote similar elements throughout the several views and wherein.

DESCRIPTION OF THE PREFERRED EMBODIMENTS

The present invention provides an illumination system having separate components for extracting and directing light from a waveguide that eliminates the need to provide a dual-function LDA that is optically and physically coupled to the waveguide. In addition, the present invention provides a more reliable and robust illumination system that virtually eliminates the failures associated with prior art illumination systems having laminated LDAs, reduces the cost of manufacturing an illumination system, and improves the overall performance and reliability of illumination systems constructed in accordance with the present invention.

Figure 1:
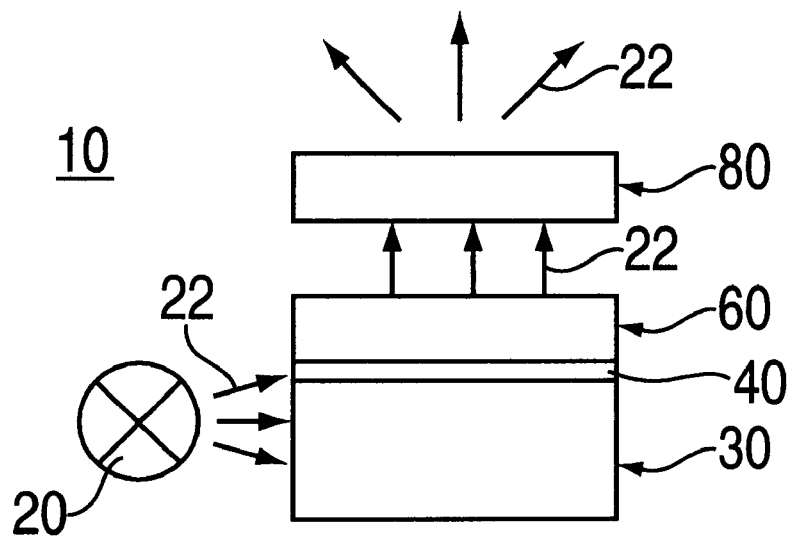
FIG. 1 is a block diagram of an illumination system having separate components for extracting and directing light constructed in accordance with the present invention.
Figure 5A:
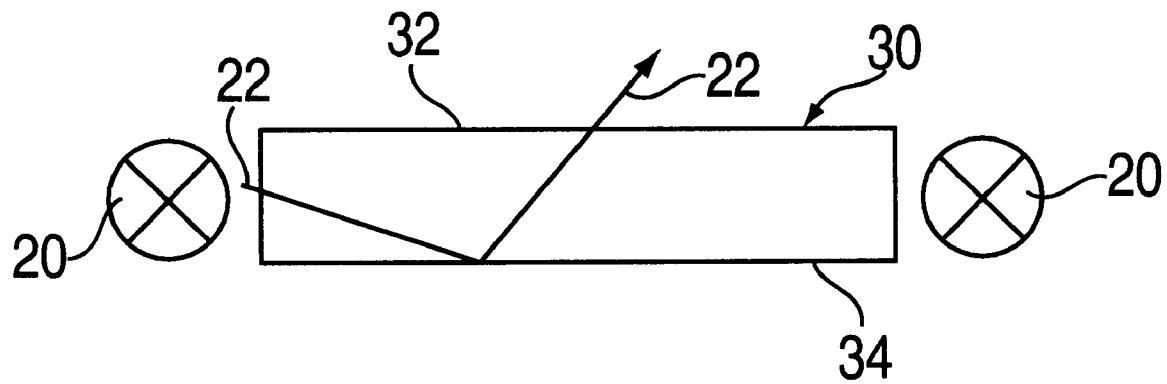
FIGS. 5a–5d are side views of various embodiments of solid waveguide geometries in accordance with the present invention.

Referring to the drawings, in FIG. 1 there is shown a block diagram of an illumination system 10 in accordance with the present invention. The illumination system 10 generally includes a solid waveguide 30 which is optically coupled to a light source 20. Light rays 22 received from the light source 20 propagate within and through the waveguide 30 and emerge therefrom via a light extracting structure 60 which may be optically coupled to the waveguide 30 or unitarily formed therewith. The emerging light rays 22 pass from the light extracting structure 60 to a separate light directing structure 80 that directs the distribution of light output from the illumination system 10. Physical and optical contact between a light output surface 32 (see, e.g. FIG. 5a) of the waveguide 30 and a light input surface 66 (see, e.g. FIG. 6a) of the light extracting structure 60 is on the order of approximately 100%. Where the light extracting structure 60 is not unitarily formed with the waveguide 30, an interface 40 provides approximately 100% physical and optical contact therebetween. The waveguide 30 has a first refractive index n1 that is preferably greater than 1. In a preferred embodiment, where the waveguide 30 is constructed of acrylic or polycarbonate, the first refractive index n1 is approximately 1.49 and 1.59, respectively. The interface 40 has a second refractive n2 index that is less than the first refractive index n1.

Figure 2:
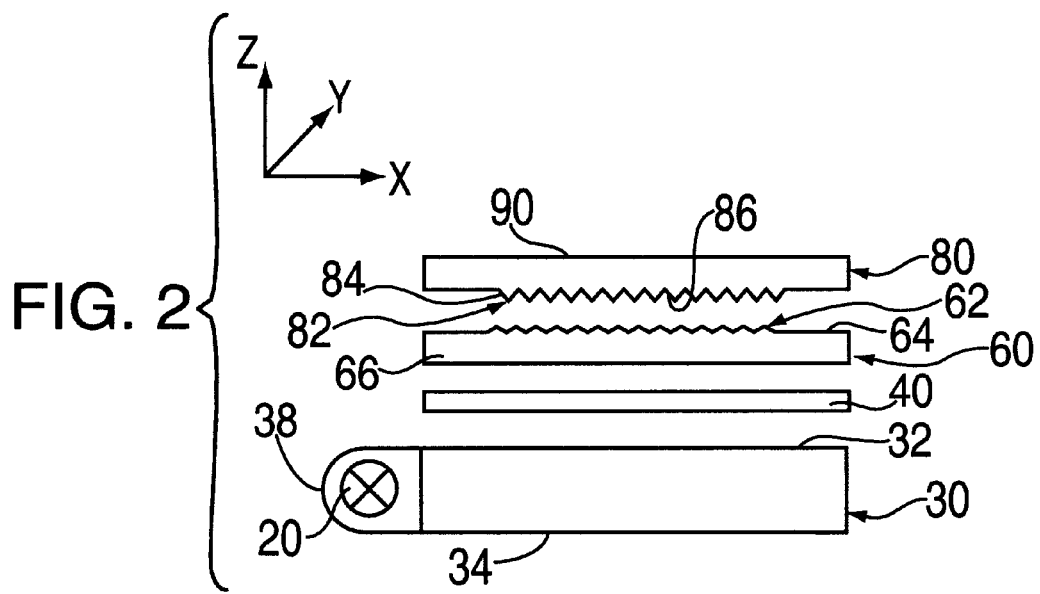
FIG. 2 is an exploded side-view of a first embodiment of an illumination system constructed in accordance with the present invention.

The number of light sources 20 provided in the illumination system 10 of the present invention depends in part on the shape of the waveguide 30 and upon the light output requirements of the illumination system 10. In addition, the light source 20 may be point-like (light bulbs), linear (fluorescent tubes), or annular. The light source 20 is preferably located at an edge of the waveguide 30 such that light rays 22 enter the waveguide 30 at an angle that is generally perpendicular to the angle at which the light rays 22 emerge from the illumination system 10. For example, light rays 22 enter the waveguide 30 generally along the x-axis and emerge from the illumination system 10 generally along the z-axis, as shown in FIG. 2. A reflector 38 (see, e.g. FIG. 2) may surround the light source 20 to direct light rays 22 emanating therefrom into the waveguide 30. The back 34 of the waveguide 30 may be smooth and preferably includes a reflector (not shown).

A first embodiment of the illumination system 10 of the present invention is shown in FIG. 2. The illumination system 10 includes a solid, generally rectangular waveguide 30 and a light extracting structure 60 physically and optically connected thereto by an interface 40. The interface 40 may be any commercially available adhesive including fluorine polymers and acrylic polymers, and other silicone or acrylic based materials, so long as its refractive index n2 is less than the refractive index n1 of the waveguide 30. A light extracting feature 62 defined on the light extracting structure 60 preferably comprises a plurality of generally lenticular perturbations defined in a light output surface 64 of the light extracting structure 60. The light extracting feature 62 is preferable oriented substantially perpendicular to the average direction at which light rays enter and propagate within and through the waveguide 30. In the embodiment of FIG. 2, the light extracting feature 62 preferably comprises a plurality of substantially unidirectional scratches scored in the light output surface 64. The light directing structure 80 is secured to the light extracting structure 60, and/or to the waveguide 30 by clamps, adhesives, screws, or other know affixation techniques (not shown). Intimate contact is not required between the light directing structure 80 and light extracting structure 60 (i.e. between the light extracting feature 62 and light directing feature 82), although such contact will not necessarily adversely effect the performance and operation of the illumination system 10 of the present invention. A light directing feature 82 is defined on a light input surface 86 of the light directing structure 80 and includes a plurality of generally lenticular prisms 84 that preferably extend in a direction parallel with the light extracting feature 62. The light output surface 90 of the light directing structure 80 is preferably substantially planar. Alternately, the light directing features can be on the light output surface 90, as shown in FIG. 7b. Light rays 22 emerge from the light extracting structure 60 (via the light output surface 64 and light extracting feature 62) and pass into the light directing structure 80 via the light input surface 86. Distribution of light output from the illumination system 10 of the present invention is controlled, at least in part, by the properties of the interface (i.e. its refractive index n2) and by the properties and geometries of the light extracting feature 62 and directing feature 82, as described in more detail below.

For some illumination system applications, the light extracting structure 60 also functions as a light directing structure, thereby eliminating the need for a separate light directing structure 80.

Figure 3:
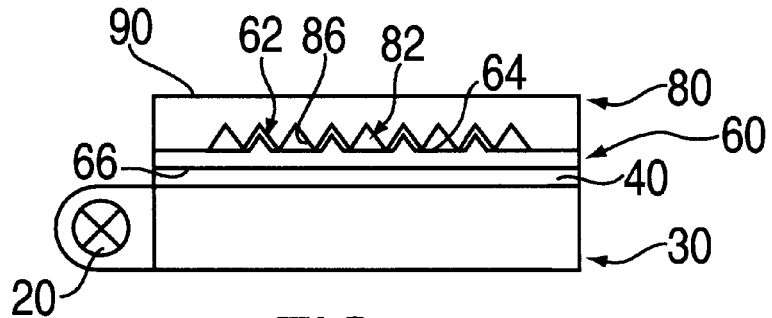
FIG. 3 is a side-view of a second embodiment of an illumination system constructed in accordance with the present invention.
Figure 9A:
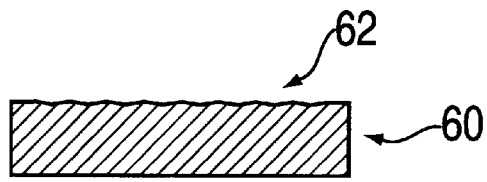
FIGS. 9a–9g are cross-sectional side views of various embodiments of light extracting features in accordance with the present invention.
Figure 9B:
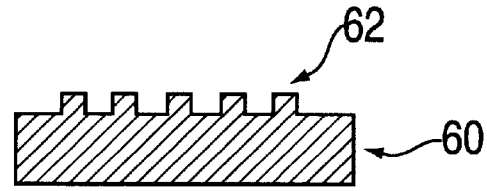
Figure 9C:
Figure 9D:
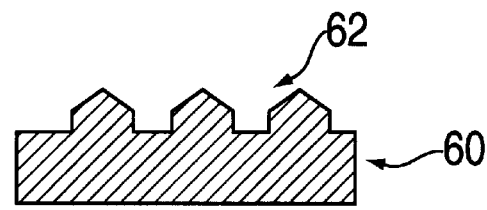
Figure 9E:
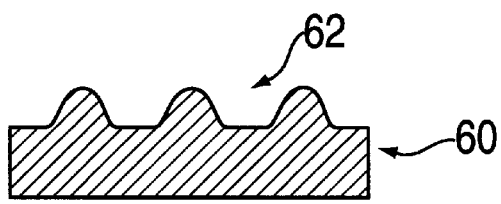
Figure 9F:
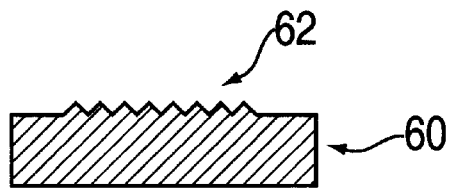
Figure 9G:
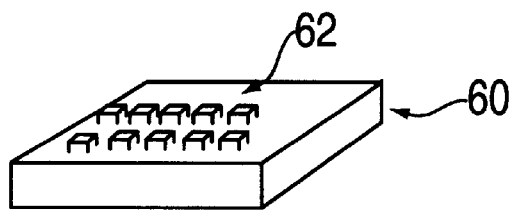

The embodiment depicted in FIG. 3 differs from that of FIG. 2 in that the light extracting feature 62 and light directing feature 82 are complementarily sized and shaped and positioned in registered engagement with each other. In this embodiment, the light extracting feature 62 defines a plurality of generally lenticular perturbations that extend in a direction substantially perpendicular to the direction at which light rays 22 enter and propagate within and through the waveguide 30. The light extracting feature 62 has a cross-sectional shape that is, for example, triangular, trapezoidal, square, rectangular, multifaceted, and curved (see, e.g. FIGS. 9a–9f). Other cross-sectional shapes are also contemplated by the present invention, with the shapes previously described and shown in FIGS. 9a–9f being provided by way of non-limiting example. The light extracting feature 62 may alternatively comprise an array of perturbations defined in the light output surface 64, with each perturbation having a cross-sectional shape, as shown in FIG. 9g. The individual light extracting features 62 may be separated from each other by constant or varying spaces (i.e. symmetrical or asymmetrical placement), or they may contact each other, as shown in FIG. 9f. The light extracting feature 62 may extend longitudinally along or transversely across the waveguide 30.

Figure 8A:
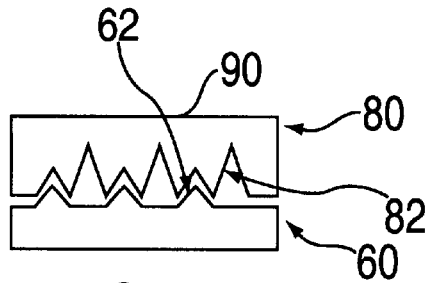
FIGS. 8a–8e are side views showing the registrable engagement between various light directing features and various light extracting features in accordance with the present invention.
Figure 8B:
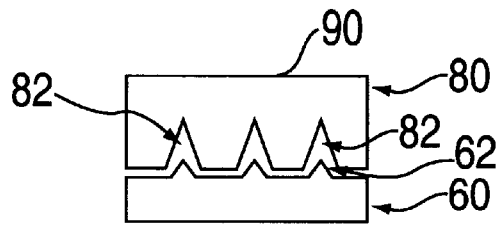
Figure 8C:
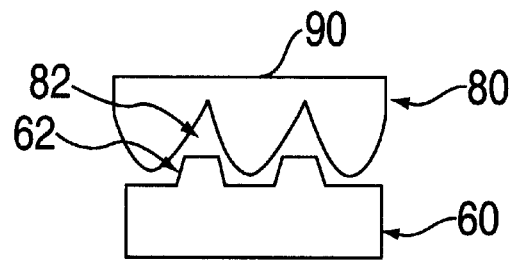
Figure 8D:
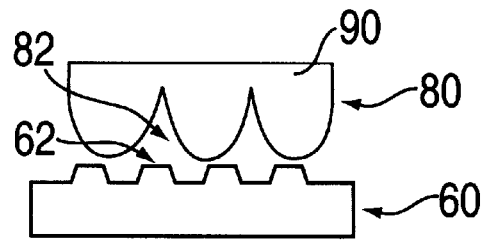
Figure 8E:
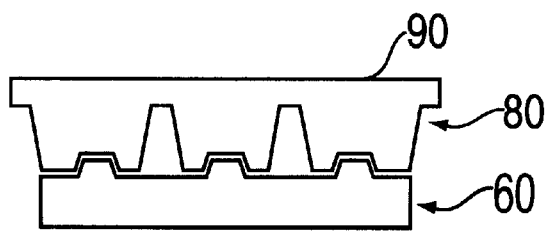

The light directing feature 82 defined on the light input surface 86 of the light directing structure 80 is complementarily sized and shaped with the light extracting feature 62 so as to permit registered engagement therebetween. For example, for a light extracting feature 62 having a generally triangular cross-sectional shape (as shown in FIG. 9c), the light directing feature 82 may also have a generally triangular cross-sectional shape. Alternatively the light directing feature 82 is complementarily sized with the light extracting feature 82, but has a cross-sectional shape that would permit the light extracting feature 62 to rest within the light directing feature 82, or visa versa, as shown in FIG. 8c. Intimate contact is not required between the light extracting feature 62 and light directing feature 82, although such contact will not necessarily adversely effect the performance or operation of the illumination system 10 of the present invention.

Figure 4:
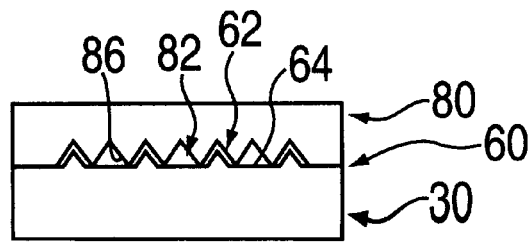
FIG. 4 is a side view of a third embodiment of an illumination system constructed in accordance with the present invention.
Figure 5B:
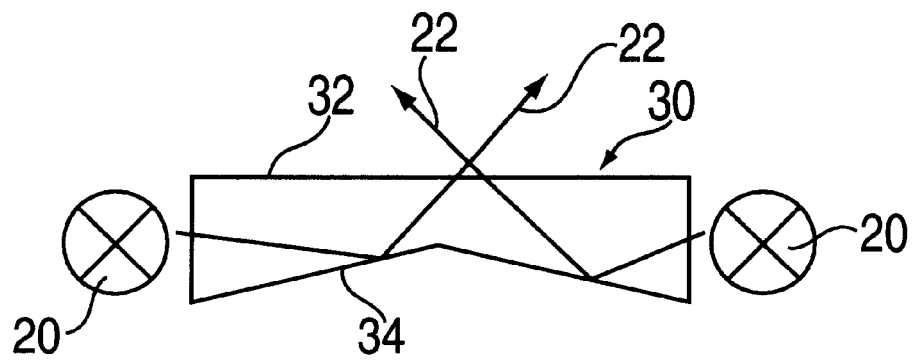
Figure 5C:
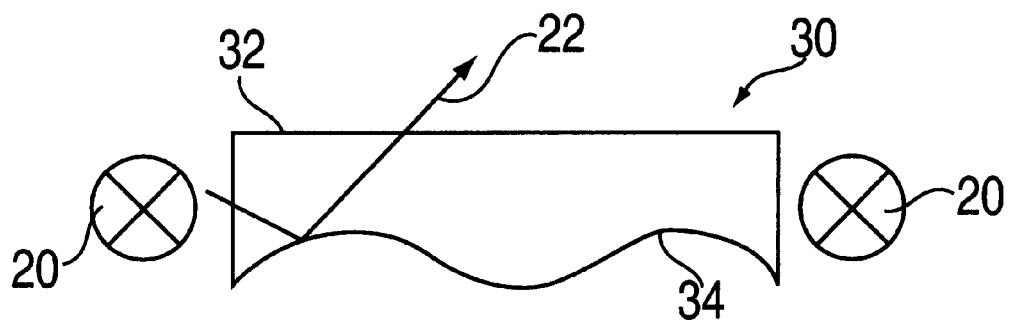
Figure 5D:
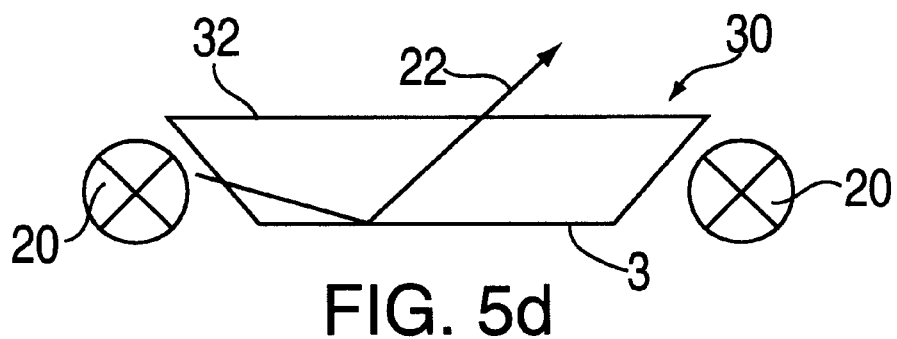

In a third embodiment of the present invention, shown in FIG. 4, the light extracting structure 60 and light directing feature 62 are unitarily formed with the solid waveguide 30. The light extracting feature 62 and light directing feature 82 are also complementarily sized and, optionally, also complementarily shaped to permit registered engagement therebetween. The construction, i.e. size and shape, of the light extracting feature 62 and light directing feature 82 is substantially the same as that described for the embodiment of FIG. 3.

Having thus described the general configuration of an illumination system 10 constructed in accordance with various embodiments of the present invention, the specific construction of the light extracting structure 60 and light directing structure 80, and the interrelationship therebetween, will now be described in more detail.

Figure 6A:
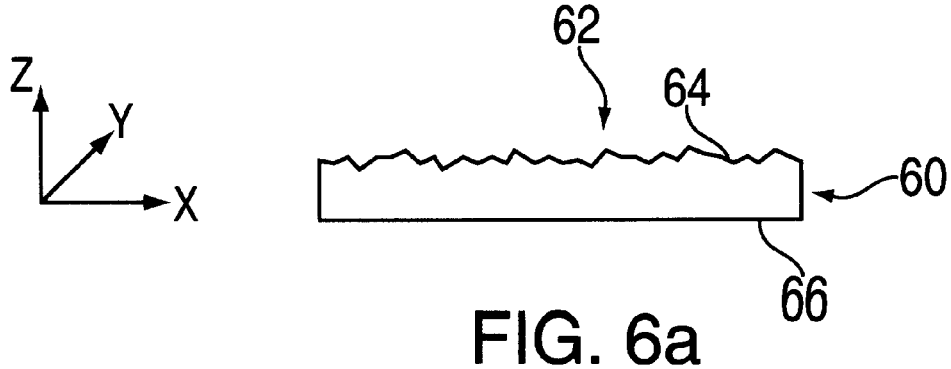
FIGS. 6a–6e are cross-sectional and side views of various embodiments of light extracting features in accordance with the present invention.

Various embodiments of light extracting feature 62 are shown in FIGS. 6a–6e. In general, the light extracting feature 62 comprises a plurality of generally lenticular perturbations defined in the light output surface 64 of the light extracting structure 60. When viewed in cross-section, the light extracting feature 62 has a wide side 67 and a narrow side 69, seen clearly in FIG. 6b. In a preferred embodiment, the light extracting feature 62 is located with respect to the waveguide 30 such that the wide side 67 of the light extracting feature 62 is closer to the waveguide 30 (i.e., closer to the light output surface 32 of the waveguide 30) than the narrow side 69. This configuration provides diffusion of the light rays 22 primarily in the x-z direction, i.e. in a single direction. As described above, the light extracting structure 60 may be separate from, or unitarily formed with, the solid waveguide 30. In FIG. 6a, the light extracting feature 62 comprises a plurality of randomly or evenly spaced scratches on the light output surface 64 made by sanding, scoring and the like. The light extracting feature 62 preferably extends in a direction generally perpendicular to the direction at which light rays 22 enter and propagate through and within the waveguide 30, i.e. in the y-direction, although the light extracting feature 62 may extend in a direction generally parallel to the direction of light travel, i.e. in the x-direction. Still other alternative perturbations comprising the light extracting feature 62 include cross-sectionally square or rectangular bumps, trapezoidal or triangular bumps, multi-faceted bumps, bumps having curved sides, and continuously curved bumps, arranged in arrays or extending longitudinally along or transversely across the waveguide 30.

The light extracting feature 62 defines an area on the light extracting structure 60 that is less than or equal to the total area of the light extracting structure 60. Preferably, the area defined by the light extracting feature 62 is between approximately 5% and 100% of the total area of the light extracting structure 60.

Figure 6B:
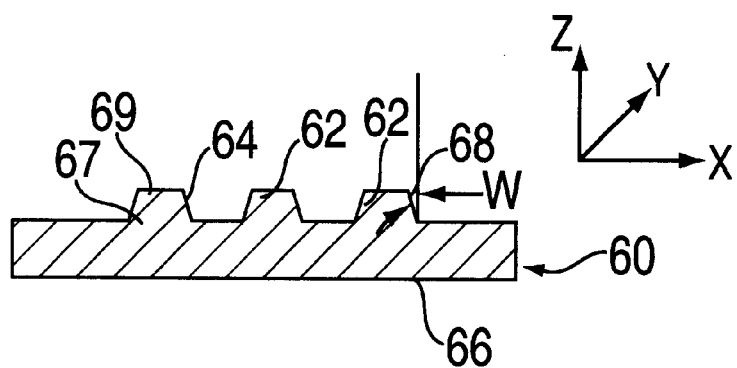
Figure 6C:
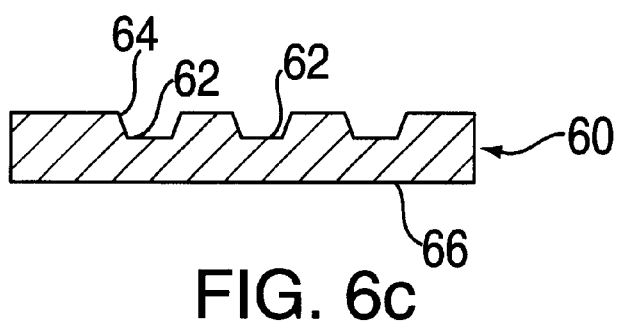
Figure 6D:
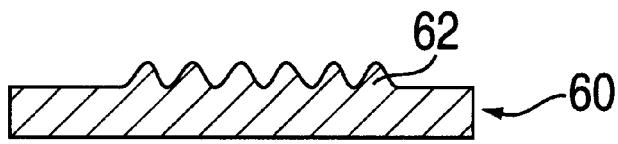

Further alternative embodiments of the light extracting features 62 are shown, by way of non-limiting example, in FIGS. 6b–6e. In FIG. 6b, the light extracting feature 62 comprises a plurality of generally lenticular polygonal perturbations that extend generally outward from the light extracting structure 60 to provide a structured light output surface 64. In another embodiment of the light extracting feature 62, shown in FIG. 6c, the light output surface 64 of the light extracting structure 60 is structured by a plurality of light extracting features 62 defined as generally lenticular polygonal cavities. In FIG. 6d the light extracting feature 62 comprises a plurality of outwardly extending, generally lenticular curved perturbations.

Figure 6E:
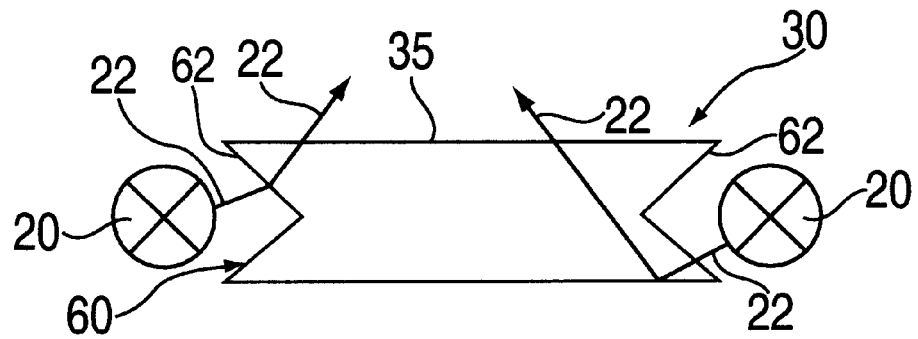

Still another embodiment of the light extracting feature 62 of the present invention is depicted in FIG. 6e. The light extracting feature 62 of this embodiment is located near the light source(s) 20 and comprises two generally converging surfaces which redirect light rays 22 from the light sources 20 before the light rays 22 enter the waveguide 30. In contrast, the light directing features 62 depicted in FIGS. 6a–6d effect the light rays 22 only after they have entered the waveguide 30. In either case, the light extracting feature 62 provides the means by which the light rays 22 propagating within and through the waveguide 30 emerge therefrom.

Figure 7A:
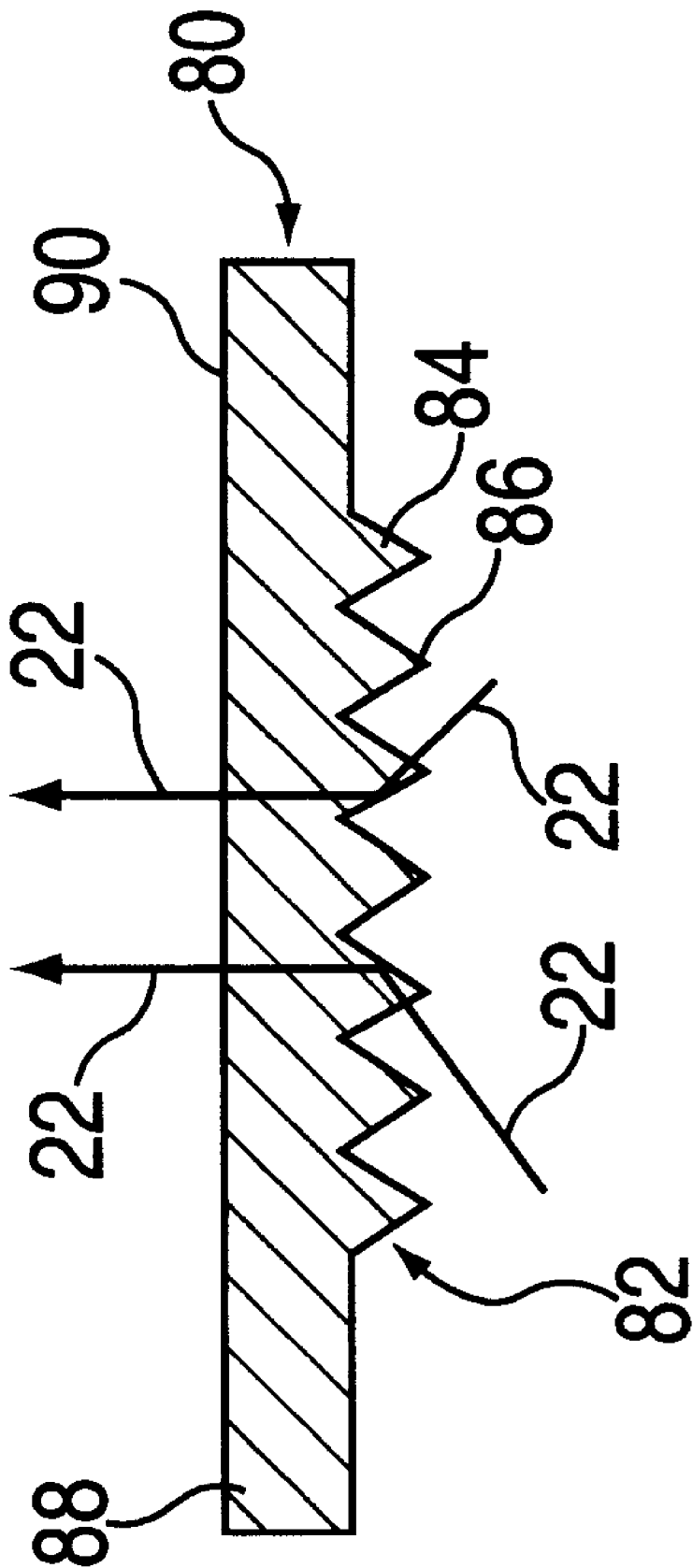
FIGS. 7a–7c are cross-sectional side views of various embodiments of light directing features in accordance with the present invention.
Figure 7B:
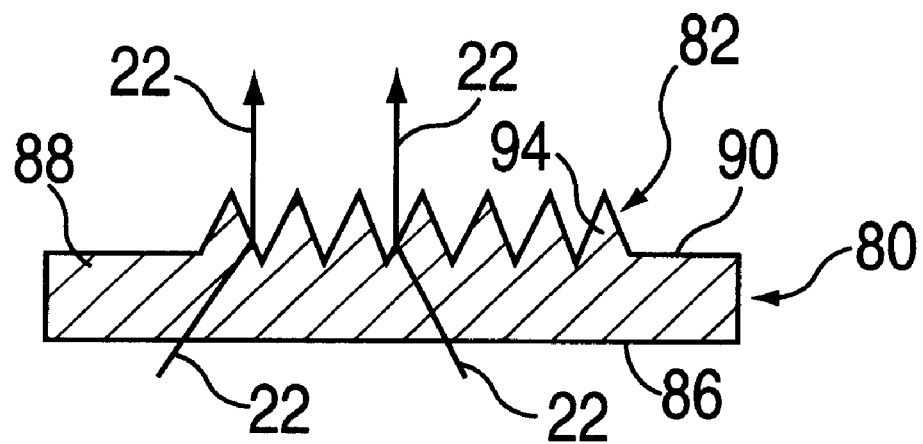
Figure 7C:
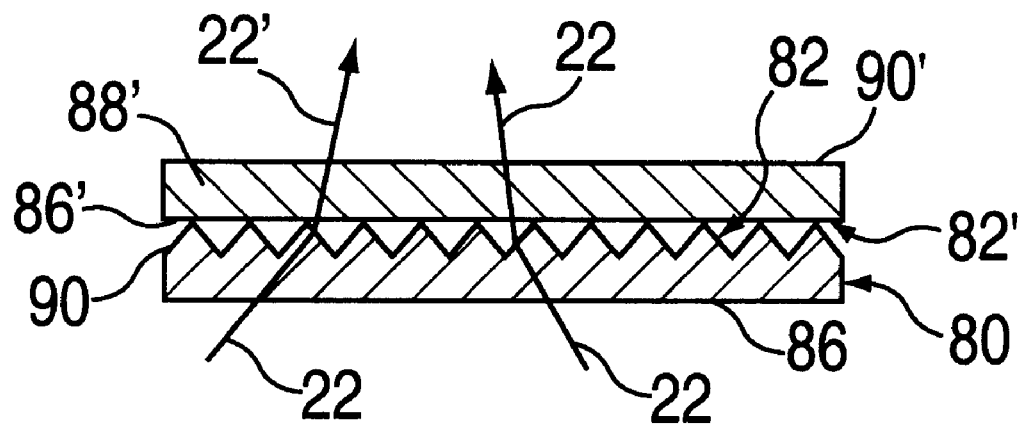

The light directing structure 80 of the present invention may be constructed in a variety of ways to provide the desired light directing functionality; three such illustrative, non-limiting embodiments are depicted in FIGS. 7a–7c. It will be obvious to persons skilled in the art that light directing structure 80 constructed differently from those depicted in FIGS. 7a–7c are contemplated by the present invention, and that these embodiments are disclosed herein as non-limiting examples of the present invention. Referring first to FIG. 7a, the light directing structure 80 is constructed as a light directing array (LDA) 88 having a substantially planar light output surface 90 and a light directing feature 82 configured as a structured light input surface 86 comprising an array of generally lenticular perturbations 84 having a generally triangular cross-sectional shape. The light input surface 86 need not contact the light output surface 64 of the light extracting structure 60, although such contact will not adversely effect the operation or performance of the illumination system 10 and is contemplated by the present invention. In a preferred embodiment, the light extracting feature 62 and light directing feature 82 comprise complementary spaces that may be placed in registered engagement with each other. Five examples of such complementary light extracting features 62 and light directing features 82 are shown in FIGS. 8a–8e.

In the embodiment shown in FIG. 7b, the light directing structure 80 comprises an LDA 88 having a structured light output surface 90 and a substantially planar light input surface 86. A light directing feature 82 defined on the light output surface 90 comprises a plurality of generally triangularly shaped, lenticular lenses 94 arranged in contacting relation to each other.

Referring next to FIG. 7c, the light directing structure 80 comprises first and second LDAs 88, 88' that respectively include first and second light directing features 82, 82'; both configured as generally lenticular perturbations 84, 84' having a generally two-dimensional cross-sectional shape. Alternatively, the first and second light directing features 82, 82' may comprises a plurality of generally lenticular prismatic arrays having a generally multidimensional cross-sectional shape (i.e., three-dimensional). The LDAs 88, 88' include respective light output surfaces 90, 90' and light input surfaces 86, 86'. In a preferred embodiment, the light input surface 86 of the first LDA 88 is substantially planar; and the light output surface 90 is structured. For the second LDA 88', the light input surface 86' is structured and the light output surface 90' is substantially planar. In a preferred embodiment, the first and second light directing features 82, 82' are stacked in directly opposing relation to each other, and arranged generally orthogonally with respect to each other.

Figure 10:
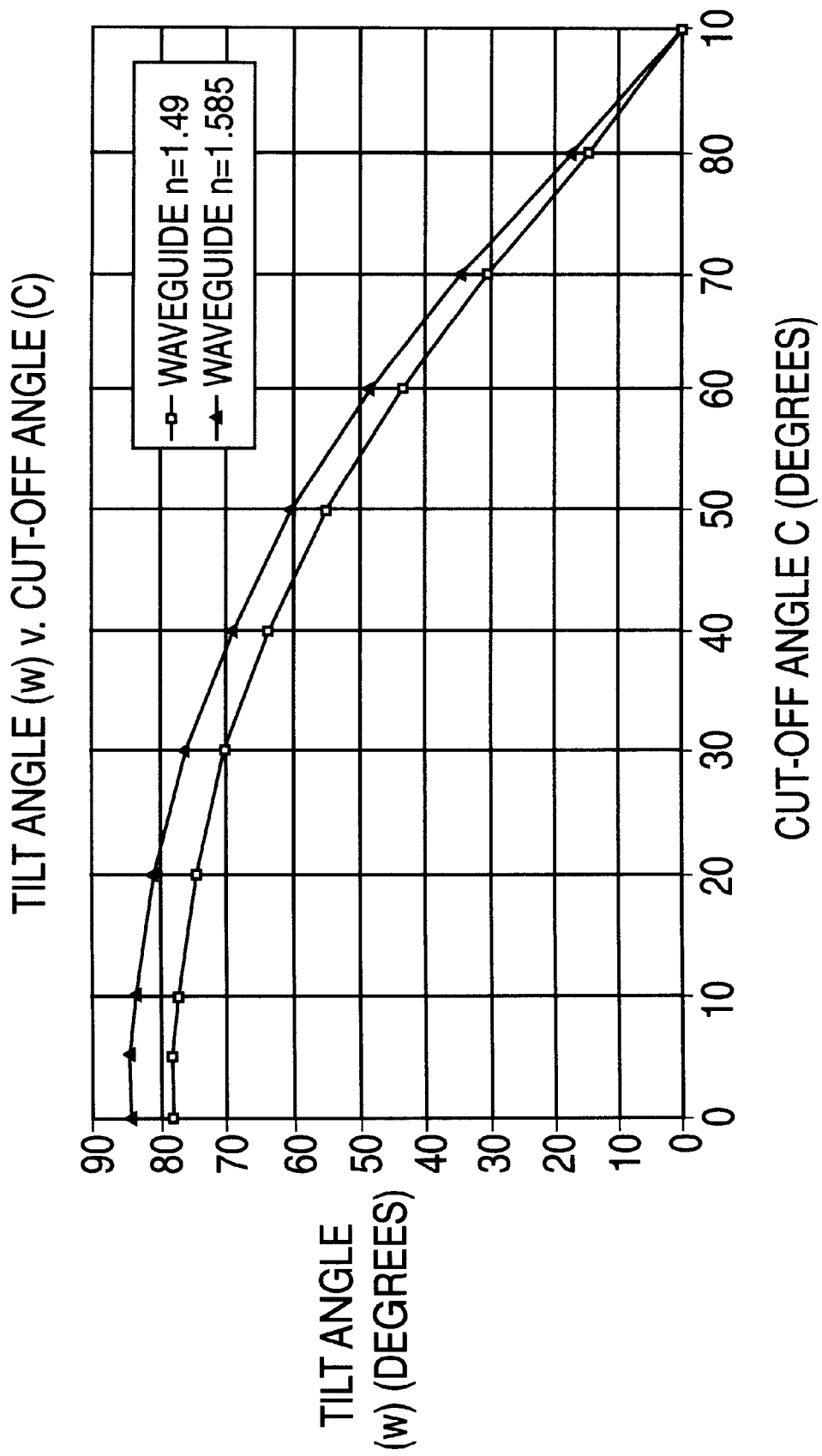
FIG. 10 is a graphical representation of the relationship between tilt angle of the sidewall of the light extracting feature and cut-off angle of light output from the illumination system in accordance with the present invention.

The angular distribution of light output from the illumination system 10 of the present invention is controlled, at least in part, by the configuration of the light extracting feature 62. More specifically, and with reference to FIG. 6b, a tilt angle w is defined as the angle between a line perpendicular to the light output surface 64 and the tilt or slope of the sidewall 68 of the light extracting feature 62. The tilt angle w is calculated using the following equation:

$$w = \operatorname{asin}(2*\cos(C)*(n1^2-1)^{1/2}/(n1^2-\sin^2 C)) \qquad (1)$$

where C is the desired cut-off angle and n1 is the first refractive index of the light extracting structure 60. The cut-off angle C is defined as a viewing angle from normal (defined herein as a viewing angle of approximately 0° with respect to the light output surface 90 of the illumination system 10) taken along the y-axis (see, e.g., FIG. 6b) and beyond which no appreciable amount of light may be visually detected as emanating from the illumination system 10. For preferred embodiments of the present invention, the cut-off angle ranges from between 0° and 90°. The relationship between tilt angle w and cut-off angle C is graphically shown in FIG. 10, with the tilt angle w generally decreasing as the cut-off angle C increases.

Figure 11:
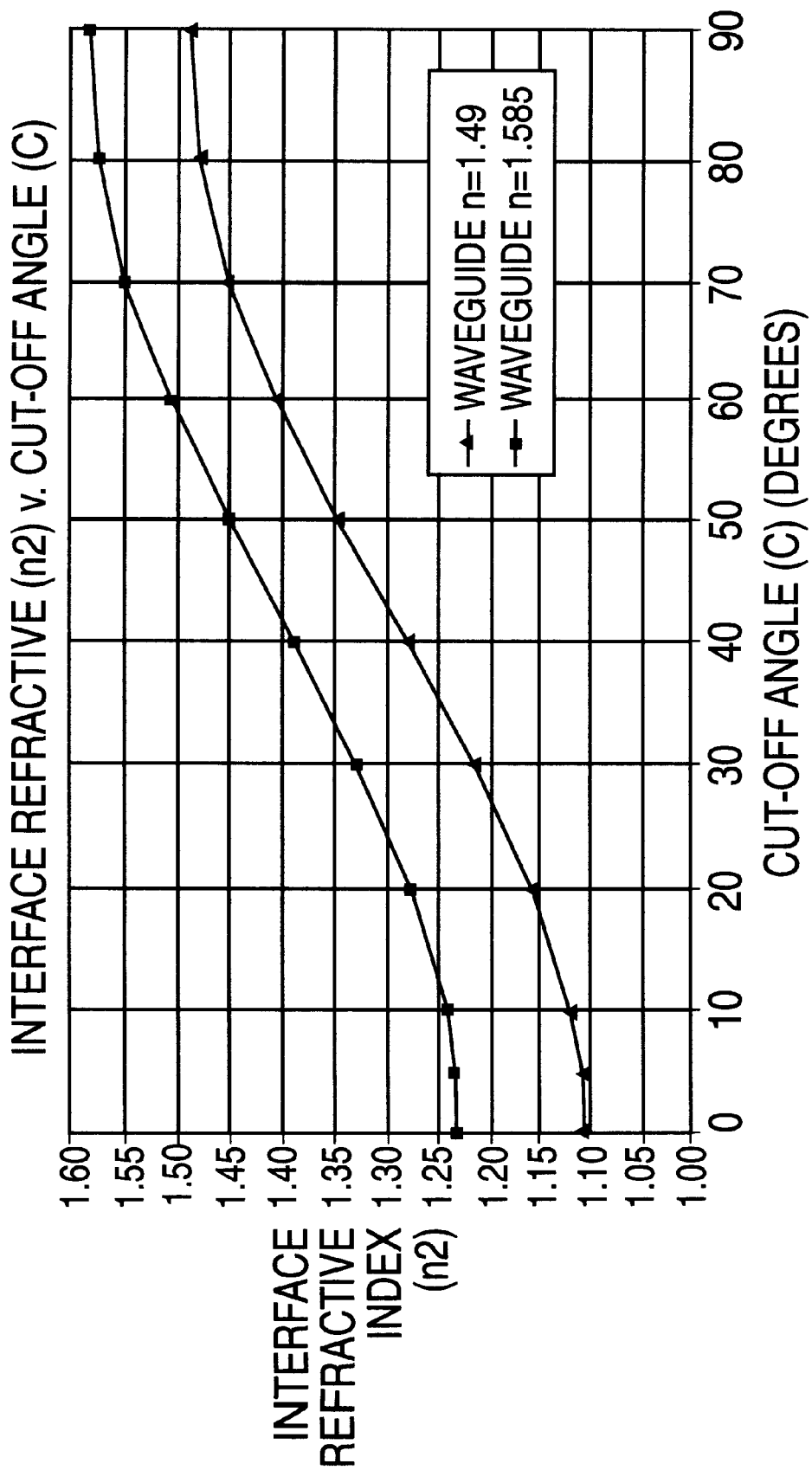
FIG. 11 is a graphical representation of the relationship between the refractive index of the interface and the cut-off angle of light output from the illumination system in accordance with the present invention.

The angular distribution of light output from the illumination system 10 is also controlled, at least in part, by the refractive index n2 of the interface 40, when provided. The relationship between the refractive index n2 of the interface 40 and the cut-off angle C is defined by the equation:

$$n2 \leq (n1^2-(\cos(C))^2)^{1/2} \qquad (2)$$

where n2 is the refractive index of the interface 40, n1 is the refractive index of the waveguide 30, and C is the desired cut-off angle. This relationship is shown graphically in FIG. 11.

By varying the tilt angle w of the sidewall 68 of the light extracting feature 62 and by selecting an interface 40 having a specific refractive index n2, and selecting a light directing feature shape, the cut-off angle C in all directions can be selectively determined and the light output distribution of the illumination system 10 of the present invention, selectively controlled.

Having thus described the invention in rather full detail, it will be recognized that such detail need not be strictly adhered to but that various changes and modifications may suggest themselves to one skilled in the art, all falling within the scope of the invention, as defined by the subjoined claims.

What is claimed is:

1. An illumination system for distributing light rays from a light source, said illumination system comprising:
    a waveguide for propagating light rays from the light source and having a first refractive index that is greater than 1;
    a light extracting structure having a light extracting feature defined thereon for facilitating the egress of light rays directly from said solid waveguide through said light extracting structure, said light extracting feature, when viewed in cross-section, having a wide side and a narrow side, said wide side of said light extracting feature being located closer to said solid waveguide than said narrow side of said light extracting feature; and
    an interface for coupling said light extracting structure with approximately 100% contact to said solid waveguide, said interface having a second refractive index that is less than said first refractive index of said solid waveguide, wherein said second refractive index determines, at least in part, a cut-off angle for light output from said illumination system, said second refractive index being determined by the equation:

$$n2 \leq (n1^2-(\cos(C))^2)^{1/2}$$

where n2 is said second refractive index, n1 is said first refractive index, and C is said cut-off angle of light output from said illumination system.

2. An illumination system as recited by claim 1, wherein said interface is fluorine polymer based, silicone based or acrylic based.

3. An illumination system as recited by claim 1, wherein said light extracting structure comprises a plurality of generally lenticular perturbations defined in a light output surface of said light extracting structure.

4. An illumination system as recited by claim 3, wherein said light extracting feature is oriented substantially not parallel to the average direction at which light rays enter and propagate through said solid waveguide.

5. An illumination system as recited by claim 3, wherein said light extracting feature is oriented substantially perpendicular to the average direction at which light rays enter and propagate through said solid waveguide.

6. An illumination system as recited by claim 3, wherein said light extracting feature is generally lenticular and has a cross-sectional shape that is selected from a group consisting of trapezoidal, triangular, square, rectangular, multi-faceted and curved.

7. An illumination system as recited by claim 3, wherein said light extracting feature comprises a plurality of scratches in said light output surface.

8. An illumination system as recited by claim 3, wherein said light extracting feature defines an area on the light extracting structure that is at least 5% to the total area defined by said light extracting structure.

9. An illumination system as recited by claim 1, wherein said waveguide is acrylic or polycarbonate.

10. An illumination system as recited by claim 9, wherein said light extracting feature determines, at least in part, a cut-off angle for light output from said illumination system, said light extracting feature further comprising a sidewall defining a tilt angle determined by the equation:

$$w = \operatorname{asin}(2*\cos(C)*(n1^2-1)^{1/2}/(n1^2-\sin^2 C))$$

where w is said tilt angle, C is said cut-off angle of light output from said illumination system, and n1 is said first refractive index.

11. An illumination system as recited by claim 1, further comprising a light directing structure on top of said light extracting structure but separate therefrom for directing the distribution of light output from said light extracting structure.

12. An illumination system as recited by claim 11, wherein said light directing structure further comprises a light directing feature defined thereon that comprises a plurality of generally lenticular grooves that are oriented substantially parallel to the orientation of said generally lenticular light extracting features.

13. An illumination system as recited by claim 12, wherein said generally lenticular grooves have a cross-sectional shape that is selected from a group consisting of trapezoidal, triangular, square, rectangular, multi-faceted and curved.

14. An illumination system for distributing light rays from a light source, said illumination system comprising:
- a waveguide for propagating light rays from the light source and having a first refractive index that is greater than 1;
- a light extracting structure having a light extracting feature defined thereon for facilitating the egress of light rays directly from said solid waveguide through said light extracting structure, said light extracting feature, when viewed in cross-section, having a wide side and a narrow side, said wide side of said light extracting feature being located closer to said solid waveguide than said narrow side of said light extracting feature;
- an interface for coupling said light extracting structure with approximately 100% contact to said solid waveguide, said interface having a second refractive index that is less than said first refractive index, wherein said second refractive index determines, at least in part, a cut-off angle for light output from said illumination system, said second refractive index being determined by the equation:

$$n2 \leq (n1^2 - (\cos(C))^2)^{1/2}$$

where n2 is said second refractive index, n1 is said first refractive index, and C is said cut-off angle of light output from said illumination system; and
- a light directing structure, separate from said light extracting structure, having a light directing feature defined thereon for directing the distribution of light output from said illumination system, said light directing feature being complementarily sized and shaped to said light extracting feature and positioned in registered engagement therewith.

15. An illumination system as recited by claim 14, wherein said interface is either fluorine polymer based, silicone based or acrylic based.

16. An illumination system as recited by claim 14, wherein said light extracting feature comprises a plurality of generally lenticular perturbations defined in a light output surface of said light extracting structure.

17. An illumination system as recited by claim 16, wherein said light extracting feature defines an area on the light extracting structure that is at least 5% to the total area defined by said light extracting structure.

18. An illumination system as recited by claim 17, wherein said light extracting feature is oriented substantially not parallel to the average direction at which light rays enter and propagate through said solid waveguide.

19. An illumination system as recited by claim 16, wherein said light extracting feature is oriented substantially perpendicular to the average direction at which light rays enter and propagate through said solid waveguide.

20. An illumination system as recited by claim 16, wherein said generally lenticular light extracting feature has a cross-sectional shape that is selected from a group consisting of trapezoidal, triangular, square, rectangular, multi-faceted and curved.

21. An illumination system as recited by claim 20, wherein said cross-sectional shape determines, at least in part, said cut-off angle for light output from said illumination system, and comprises a sidewall defining a tilt angle determined using the equation:

$$w = \operatorname{asin}(2*\cos(C)*(n1^2-1)^{1/2}/(n1^2-\sin^2 C))$$

where w is the tilt angle, C is said cut-off angle of light output from said illumination system, and n1 is said first refractive index.

22. An illumination system as recited by claim 14, wherein said waveguide is acrylic or polycarbonate.

23. An illumination system as recited by claim 14, wherein said complementarily sized light directing feature has a cross-section that is selected from a group consisting of trapezoidal, triangular, square, rectangular, multi-faceted and curved.

24. An illumination system for distributing light rays from a light source, said illumination system comprising:
- a solid waveguide having a refractive index greater than 1 and a light extracting structure unitarily formed therewith including a light extracting feature for facilitating the passage of light rays directly from said solid waveguide through said light extracting structure, wherein said light extracting feature defines an area on the light extracting structure that is at least 5% to the total area defined by said light extracting structure; and
- a light directing structure, separate from said light extracting structure and having a light directing feature defined thereon for directing the distribution of light rays from said light extracting structure, said light directing feature being complementarily sized and shaped with said light extracting feature and positioned in registered engagement therewith.

25. An illumination system as recited by claim 24, wherein said light extracting feature comprises a plurality of perturbations defined in a light output surface of said light extracting structure.

26. An illumination system as recited by claim 24, wherein said light extracting feature is generally lenticular and has a cross-sectional shape that is selected from the group consisting of trapezoidal, triangular, square, rectangular, multi-faceted and curved.

27. An illumination system as recited by claim 24, wherein said light extracting feature comprises an array of perturbations defined in a light output surface of said light extracting structure.

28. An illumination system as recited by claim 24, wherein said waveguide is constructed of acrylic or polycarbonate.

29. An illumination system as recited by claim 27, wherein said cross-sectional shape determines, at least in part, a cut-off angle for light output from said illumination system, and comprises a sidewall defining a tilt angle determined using the equation:

$$w = \operatorname{asin}(2*\cos(C)*(n1^2-1)^{1/2}/(n1^2-\sin^2 C))$$

where w is the tilt angle, C is said cut-off angle of light output from said illumination system, and n1 is said first refractive index.

* * * * *